(12) United States Patent
Hashimoto

(10) Patent No.: US 12,159,468 B2
(45) Date of Patent: Dec. 3, 2024

(54) VEHICLE OCCUPANT GAZE DETECTION SYSTEM AND METHOD OF USING

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 428 days.

(21) Appl. No.: 17/497,846

(22) Filed: Oct. 8, 2021

(65) Prior Publication Data

US 2023/0110464 A1  Apr. 13, 2023

(51) Int. Cl.
| | |
|---|---|
| G06V 20/59 | (2022.01) |
| B60W 40/08 | (2012.01) |
| G01S 19/42 | (2010.01) |
| G06F 18/213 | (2023.01) |
| G06Q 30/0283 | (2023.01) |
| G06V 10/50 | (2022.01) |
| G06V 20/56 | (2022.01) |
| G06V 40/19 | (2022.01) |

(52) U.S. Cl.
CPC ............ *G06V 20/59* (2022.01); *B60W 40/08* (2013.01); *G01S 19/42* (2013.01); *G06F 18/213* (2023.01); *G06Q 30/0283* (2013.01); *G06V 10/50* (2022.01); *G06V 20/56* (2022.01); *G06V 40/19* (2022.01); *B60W 2420/403* (2013.01); *B60W 2540/225* (2020.02)

(58) Field of Classification Search
CPC ........ G06V 20/59; G06V 10/50; G06V 40/19; B60W 40/08; B60W 2420/42; B60W 2540/225; G01S 19/42; G06F 18/213
See application file for complete search history.

(56) References Cited

U.S. PATENT DOCUMENTS

| | | | |
|---|---|---|---|
| 10,075,700 B2 * | 9/2018 | Blonde | G06T 15/00 |
| 10,146,778 B2 * | 12/2018 | Salyers | G06F 16/285 |
| 11,429,185 B2 * | 8/2022 | Grimm | G06V 40/18 |

(Continued)

FOREIGN PATENT DOCUMENTS

| | | | | |
|---|---|---|---|---|
| EP | 4186650 A1 * | 5/2023 | ............ | B25J 9/1697 |
| JP | 2021036366 A * | 3/2021 | | |

*Primary Examiner* — Bobbak Safaipour
*Assistant Examiner* — Ashley L. Hytrek
(74) *Attorney, Agent, or Firm* — HAUPTMAN HAM, LLP

(57) ABSTRACT

A vehicle occupant gaze detection system includes a non-transitory computer readable medium configured to store instructions thereon; and a processor connected to the non-transitory computer readable medium. The processor is configured to execute the instructions for receiving gaze data from a vehicle. The gaze data includes a viewing direction of an occupant of the vehicle, vehicle information, and time stamp information. The processor is configured to execute the instructions for generating a gridmap including an array of lattice points, and each lattice point of the array of lattice points corresponds to a location. The processor is configured to execute the instructions for generating a histogram including information related to viewing of at least one location by the occupant. The processor is configured to execute the instructions for determining an effectiveness of an object based on the histogram; and transmitting a recommendation based on the effectiveness of the object.

14 Claims, 10 Drawing Sheets

(56) References Cited

U.S. PATENT DOCUMENTS

| | | | |
|---|---|---|---|
| 11,657,263 B2* | 5/2023 | Arar | G06V 20/597 |
| | | | 382/103 |
| 2009/0306892 A1* | 12/2009 | Malka | G02B 23/18 |
| | | | 701/469 |
| 2010/0033333 A1* | 2/2010 | Victor | A61B 5/7264 |
| | | | 340/576 |
| 2011/0161160 A1 | 6/2011 | Carlson et al. | |
| 2014/0039788 A1* | 2/2014 | Fuehrer | G06Q 30/0242 |
| | | | 701/400 |
| 2014/0078282 A1 | 3/2014 | Aoki et al. | |
| 2018/0253779 A1* | 9/2018 | Dongre | G06Q 30/0631 |
| 2021/0056306 A1* | 2/2021 | Hu | G06V 40/193 |
| 2021/0370954 A1* | 12/2021 | Alvarez | G06V 20/59 |

\* cited by examiner

Log Entry 56

- Time 57 when this grid was payed attention
- Position 58 of vehicle which payed attention to this grid
- ID 59 of vehicle which payed attention to this grid

VEHICLE OCCUPANT GAZE DETECTION SYSTEM AND METHOD OF USING

BACKGROUND

Advertisements are located on signage around roadways at many locations. Prices for different advertising locations vary based on assumed amount of visibility of the advertisement. The goal for the advertisers is to have vehicle occupants, such as a driver, view the advertisement and purchase the advertised product or service.

In some instances, electronic signs periodically change to display different advertisements at different times. As a result, multiple advertisements are able to be displayed at a same location using the electronic signs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 is a diagram of a data structure of a log entry in accordance with some embodiments.

DETAILED DESCRIPTION

Figure 1:
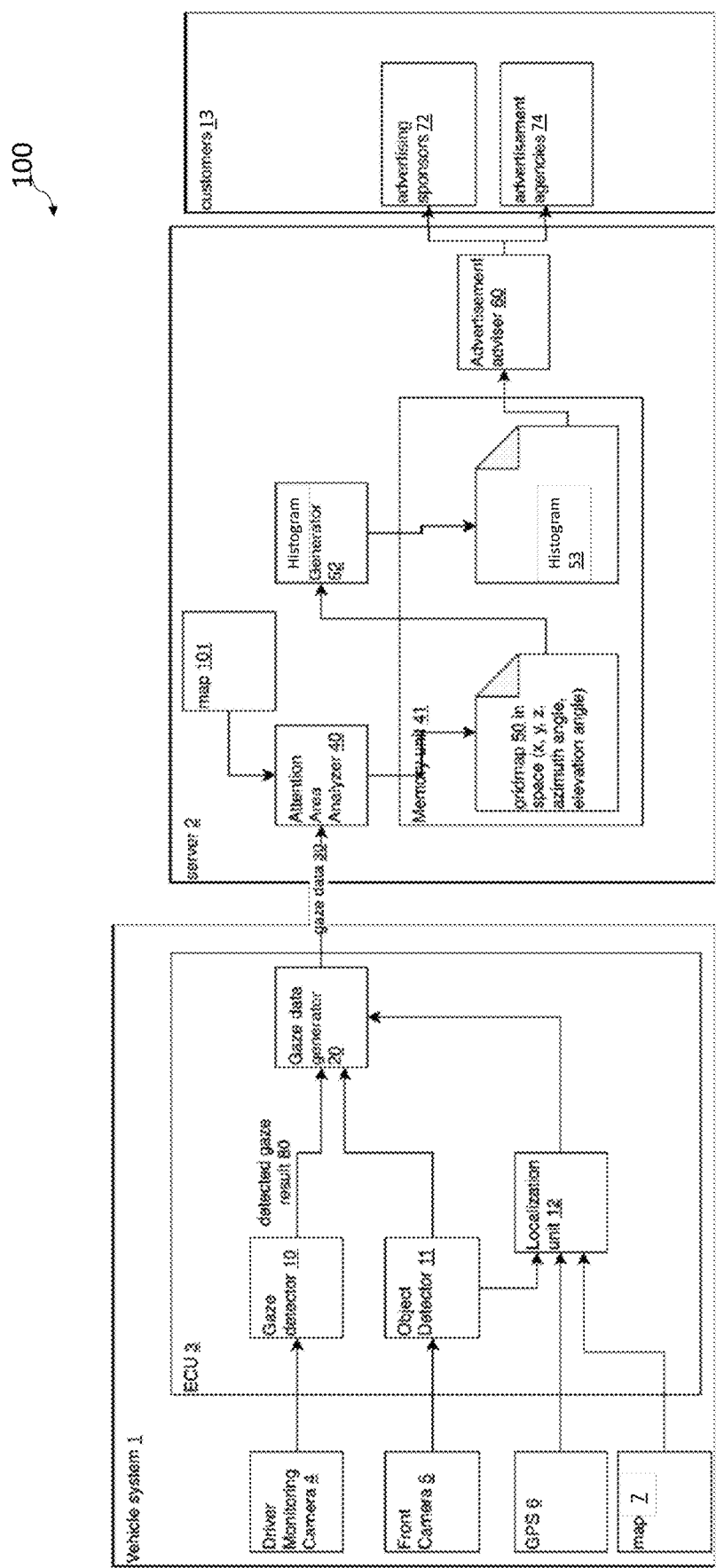
FIG. 1 is a schematic diagram of a vehicle occupant gaze detection system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Currently advertisers are unable to accurately determine how often and what type of people are viewing signs along roadways. As a result, the advertisers are unable to determine how effective the sign is at attracting customers; and the advertiser is unable to determine whether the price of placing the advertisement is commensurate with the expected customer generation. While signs located along roadways with a high volume of traffic are presumed to be more valuable than signs along roadways with a lower volume of traffic, there is still no reliable measure of how many potential customers are seeing the sign. Similarly, locations with slower moving traffic are presumed to be more valuable than locations with faster moving traffic, but again there is no way to precisely measure whether the sign is actually attracting the attention of more potential customers.

In order to provide reliable information for determining whether signs are attracting attention of potential customers as well as information about demographics of the potential customers, a vehicle occupant gaze system is utilized in combination with map data to determine whether occupants of a vehicle are looking at signs. While the following description is described with respect to signs along roadways, one of ordinary skill in the art would understand that the vehicle occupant gaze detection system is applicable to different types of advertising material, such as mobile signs transported by airplanes or other vehicles, people carrying signs, displays in store windows, or other such advertisements.

The vehicle occupant gaze detection system captures images of one or more eyes of a vehicle occupant, such as a driver, a front-seat passenger, or a rear-seat passenger. The vehicle occupant gaze detection system utilizes the captured images along with map data and/or images from an outward facing detector attached to the vehicle to determine what, if any, signs the occupant views and for how long. In some embodiments, the vehicle occupant gaze detection system also collects data on the occupant, such as predicted age, predicted height, predicted weight, hair length, hair color, clothing, etc., in order to estimate a demographic of the occupant. Based on this information, the vehicle occupant gaze detection system is able to generate historical information regarding how many people and what demographic of people are viewing signs or paying attention to the locations where advertisers could potentially place future advertisements even if no signage is currently positioned at those locations. This information usable by the advertiser to determine whether the advertisement is having a desired impact. This information is also usable by leasing agencies of the sign locations to help determine appropriate pricing for different sign locations.

FIG. 1 is a schematic diagram of a vehicle occupant gaze detection system 100 in accordance with some embodiments. The vehicle occupant gaze detection system 100 includes a vehicle system 1 configured to collect data and generate gaze data 30. The vehicle occupant gaze detection system 100 further includes a server 2 configured to receive the gaze data 30 and analyze the gaze data 30 to generate advertisement advise. The vehicle occupant gaze detection system 100 further includes customer 13 configured to receive the generated advertisement advise.

The vehicle system 1 includes an electronic control unit (ECU) 3 configured to receive data from a driver monitoring camera 4, a front camera 5, a global positioning system (GPS) 6 and a map 7. The ECU 3 includes a gaze detector 10 configured to receive data from the driver monitoring camera 4 and detect a gaze direction and/or a gaze depth based on the received data. The ECU 3 further includes an object detector 11 configured to receive data from the front camera 5 and determine a position of any detected objects based on the received data. The ECU 3 further includes a localization unit 12 configured to receive data from the GPS 6, the map 7, the object detector 11 and road recognizer (not shown in the FIG. 1) and determine a position of the vehicle and a pose and state of the vehicle relative to detected and/or known objects and/or road position. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the pose and state of the vehicle also refers to a velocity vector, an acceleration vector and jerk vector of the vehicle. In some embodiments, the position vector, the velocity vector, the acceleration vector and the jerk vector may include angle vector. In some embodiments, the state of the vehicle also refers to whether an engine or motor of the vehicle is running. The ECU 3 further includes a gaze data generator 20 configured to receive information from the gaze detector 10, the object detector 11 and the localization unit 12 and to generate gaze data 30.

The driver monitoring camera 4 is configured to capture images of a driver of the vehicle. The driver monitoring camera 4 is connected to the vehicle. In some embodiments, the driver monitoring camera 4 includes a visible light camera. In some embodiments, the driver monitoring camera 4 includes an infrared (IR) camera or another suitable sensor. In some embodiments, the driver monitoring camera 4 is movable relative to the vehicle in order to capture images of at least one eye of drivers that are different sizes. While capturing images of both eyes of the driver is preferred, some drivers have only a single eye, and in some instances where a head of the driver is turned away from the driver monitoring camera 4, only one of the driver's eyes is captured. In some embodiments, the driver monitoring camera 4 is adjusted automatically. In some embodiments, the driver monitoring camera 4 is manual adjustable. In some embodiments, the captured image includes at least one eye of the driver. In some embodiments, the captured image includes additional information about the driver, such as approximate height, approximate weight, hair length, hair color, clothing or other suitable information. In some embodiments, the driver monitoring camera 4 includes multiple image capturing devices for capturing images of different regions of the driver. In some embodiments, driver monitoring cameras are located at different locations within the vehicle. For example, in some embodiments, a first driver monitoring camera 4 is located proximate a rear view mirror in a central region of the vehicle; and a second driver monitoring camera 4 is located proximate a driver-side door. One of ordinary skill in the art would recognize that other locations for the driver monitoring camera 4, which do not interfere with operation of the vehicle, are within the scope of this disclosure. In some embodiments, the data from the driver monitoring camera 4 includes a time stamp or other metadata to help with synchronization with other data.

One of ordinary skill in the art would understand that in some embodiments the vehicle system 1 includes additional cameras for monitoring other occupants. Each of the additional cameras are similar to the driver monitoring camera 4 described above. For example, in some embodiments, one or more monitoring cameras are positioned in the vehicle for capturing images of at least one eye of a front-seat passenger. In some embodiments, one or more monitoring cameras are positioned in the vehicle for capturing images of at least one eye of a rear-seat passenger. In some embodiments, the additional cameras are only activated in response to the vehicle detecting a corresponding front-seat passenger or rear-seat passenger. In some embodiments, an operator of the vehicle is able to selectively de-activate the additional cameras. In embodiments including additional cameras, the captured images are still send to the gaze detector 10; and the gaze detector is able to generate a gaze result for each of the monitored occupants of the vehicle.

The front camera 5 is configured to capture images of an environment surrounding the vehicle. In some embodiments, the front camera 5 includes a visible light camera, an IR camera. In some embodiments, the front camera 5 is replaced with or is further accompanied by a light detection and ranging (LiDAR) sensor, a radio detection and ranging (RADAR) sensor, a sound navigation and ranging (SONAR) sensor or another suitable sensor. In some embodiments, the front camera 5 includes additional cameras located at other locations on the vehicle. For example, in some embodiments, additional cameras are located on sides of the vehicle in order to detect a larger portion of the environment to the left and right of the vehicle. Since vehicle occupants are able to look out of side windows of the vehicle, using additional cameras to detect a larger portion of the environment surrounding the vehicle helps to increase precision of determining objects being viewed by the occupants of the vehicle. For example, in some embodiments, additional cameras are located on a back side of the vehicle in order to detect a larger portion of the environment to a rear of the vehicle. This information helps to capture additional objects that vehicle occupants other than the driver are able to view out of rear window. The front camera 5 is also able to capture images for determining whether any obstructions, such as buildings, are present between a known location of an object, such as a sign, and the occupants of the vehicle. In some embodiments, the data from the front camera 5 includes a time stamp or other metadata in order to help synchronize the data from the front camera 5 with the data from the driver monitoring camera 4.

The GPS 6 is configured to determine a location of the vehicle. Knowing the location of the vehicle helps to relate the object and the direction that drew the attention of the occupants paid attention with the objects and areas that have known locations in the map 7. Knowing the heading of the vehicle helps to predict which direction a driver of the vehicle is looking in order to assist with generation of gaze data 30. Knowing a speed of the vehicle helps to determine how long an occupant of the vehicle had an opportunity to view a sign. For example, an occupant determined to be viewing a sign for two seconds (2 s) in a slow moving vehicle is determined to have less interest in the advertised product or service than an occupant determined to be viewing the sign for 2 s in a fast moving vehicle.

The map 7 includes information related to the roadway and known objects along the roadway. In some embodiments, the map 7 is usable in conjunction with the GPS 6 to determine a location and a heading of the vehicle. In some embodiments, the map 7 is received from an external device, such as the server 2. In some embodiments, the map 7 is periodically updated based on information from the front camera 5 and/or the GPS 6. In some embodiments, the map 7 is periodically updated based on information received from the external device. In some embodiments, the map 7 is generated from sensor data by simultaneous localization and mapping (SLAM) algorithm.

The following description will focus primarily on analysis of information related to the driver for the sake of brevity. One of ordinary skill in the art would understand that the description is applicable to other occupants, such as front-seat passengers or rear-seat passengers, of the vehicle as well.

The gaze detector 10 is configured to receive data from the driver monitoring camera 4 and generate a detected gaze result 80. The detected gaze result 80 includes a direction that the eyes of the driver are looking. In some embodiments, the direction includes an azimuth angle and an elevation angle. Including azimuth angle and elevation angle allows a determination of a direction that the driver is looking both parallel to a horizon and perpendicular to the horizon. In some embodiments, the detected gaze result 80 further includes depth information. Depth information is an estimated distance from the driver that visual axes of the driver's eyes converge. Including depth information allows a determination of a distance between the driver and an object on which the driver is focusing a gaze. Combining depth information along with azimuth angle and elevation angle increases a precision of the detected gaze result 80. In some embodiments where the captured image includes only a single eye of the driver, the determining depth information is difficult, so only azimuth angle and elevation angle are determined by the gaze detector 10. In some embodiments, the gaze detector 10 is further configured to receive data from the front camera 5 and to associate the detected gaze 80 with a pixel location of an image from the front camera 5 based on the azimuth angle and elevation angle.

The object detector 11 is configured to receive data from the front camera 5 as well as any additional sensors for detecting an environment surrounding the vehicle. Based on the received data, the object detector 11 identifies objects in the surrounding environment. In some embodiments, the object detector is further configured to receive data from the GPS 6 and/or the map 7 to help with identification of objects based on a location of the vehicle from the GPS 6 and location of known objects from the map 7. Using the GPS 6 and map 7 information helps to reduce processing load on the object detector 11. In some embodiments, the object detector 11 is further configured to identify a type of object, such as another vehicle, a pedestrian, a road sign, an advertising sign, an advertising sign on vehicle, a building, etc. One of ordinary skill in the art would understand that this disclosure is also applicable to determine what, if any, mobile advertisements, such as on trucks or buses, occupants of the vehicle are attracted to. In order to determine whether mobile advertisements are present, camera images are analyzed, in some embodiments. In some embodiments, location information for the mobile advertisements are combined with data from the vehicle to determine whether the occupant was observing the mobile advertisement. In some embodiments, a second vehicle that the advertising signs are painted periodically transfers the location information of the second vehicle to the server 2, and the location information of the second vehicle is mapped to the gaze data 30 at server 2. In some embodiments, the object detector 11 outputs the received data from the front camera 5 and/or from the additional sensors to the gaze data generator 20 and/or localization unit 12.

The localization unit 12 is configured to receive information from the object detector 11, the GPS 6 and the map 7 and determining a location of the vehicle in the world coordinate system or a location of the vehicle relative to the objects on the map 7 and objects detected by the object detector 11. In some embodiments, the localization unit 12 is usable to determine a heading and a speed of the vehicle. The localization unit 12 is also configured to determine state information for the vehicle. In some embodiments, the state information includes speed of the vehicle. In some embodiments, the state information includes velocity vector of the vehicle. In some embodiments, the state information includes heading of the vehicle. In some embodiments, the state information includes acceleration vector of the vehicle. In some embodiments, the state information includes jerk vector of the vehicle. In some embodiments, the state information includes whether an engine or motor of the vehicle is running. In some embodiments, the state information includes other status information related to the vehicle, such as operation of wind shield wipers, etc.

The gaze data generator 20 is configured to receive the detected gaze result 80 from the gaze detector 10, object detection information from the object detector 11, and vehicle position and state information from the localization unit 12. The gaze data generator 20 detects lines along which the driver's gaze was directed and generates gaze data 30 based on these detected lines. One of ordinary skill in the art would understand that lines of the driver's gaze refer to rays or half-lines indicating a direction from a point of the eye of the driver that the driver is looking toward. The gaze data 30 includes time stamp information, vehicle information of the vehicle system 1, position of the vehicle, and gaze angles of the driver relative to the vehicle. In some embodiments, the gaze data generator 30 is configured to determine what, if any, signs are visible to the driver. In some embodiments, the gaze data generator 30 is configured to identify any known objects from the map 7, which are obstructed by other objects that would prevent the driver from seeing the objects. These obstructed objects are identified, so that these objects are able to be excluded from consideration during generation of the gaze data 30. In some embodiments, the gaze data generator 20 further links the gaze data 30 with locations of objects from either the object detector 11 and/or the localization unit 12. In some embodiments, the gaze data generator 20 excludes any gaze data 30 related to objects that are determined as being obstructed based on information from the object detector 11 and the localization unit 12. In some embodiments, an obstruction threshold, such as 50% of an area of the object is obscured, is used by the gaze data generator 20 to determine whether to exclude gaze data 30 related to obstructed objects.

In some embodiments, the gaze data generator 20 is further configured to include at least one image of the driver in the gaze data 30 to permit demographic analysis of the driver based on the captured image. In some embodiments, the gaze data generator 20 is configured to include driver identification data, such as an identification number of the driver, with the gaze data 30 to permit demographic analysis of the driver. In some embodiments, the driver identification data is received based on ownership or rental information stored in the ECU 3.

The gaze data generator 20 outputs the gaze data 30 to be transmitted to the server 2. In some embodiments, the vehicle system 1 transmits the gaze data to the server 2 wirelessly. In some embodiments, the vehicle system 1 transmits the gaze data to the server 2 via a wired connection.

The server 2 includes a map 101. The server further includes an attention area analyzer 40 configured to receive the gaze data 30 from the vehicle system 1. The attention area analyzer 40 is further configured to receive information from the map 101. The attention arear analyzer 40 is configured to generate a gridmap 50 based on the gaze data 30 and the map 101. The server 2 further includes a memory unit 41 configured to store the gridmap 50 and a histogram 53. The gridmap 50 is accessible by a histogram generator 52 for associating the gridmap 50 with additional data, such as date, time, demographic data, or other suitable information. The histogram generator 52 is configured to generate a histogram 53 based on the associations with the gridmap 50; and to store the histogram 53 in the memory unit 41. The server 2 further includes an advertisement adviser 60 configured to receive the histogram 53 from the memory unit 41. The advertisement adviser 60 is configured to analyze the histogram 53 and determines what type of person is viewing signs, when and for how long.

The map 101 includes information related to the roadway and known objects along the roadway. In some embodiments, the map 101 is the same as map 7. In some embodiments, the map 101 has higher definition than map 7. In some embodiments, the map 101 is received from an external device. In some embodiments, the map 101 is periodically transmitted to the vehicle system 1 for updating map 7. In some embodiments, the map 101 is periodically updated based on updated information received by the server 2.

Figure 7:
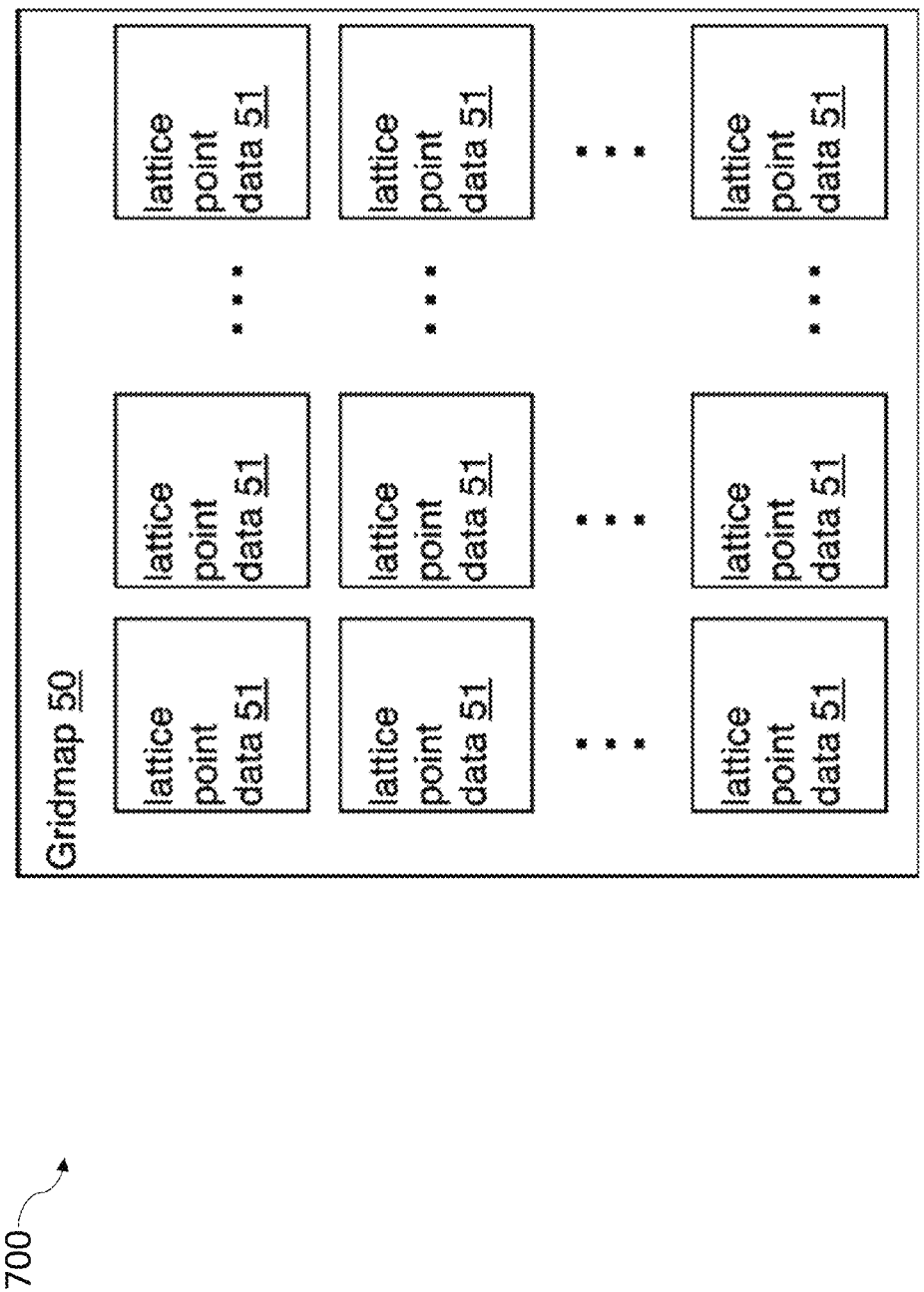
FIG. 7 is a diagram of a data structure of a gridmap in accordance with some embodiments.

The attention area analyzer 40 is configured to correlate the received gaze data 30 with the map 101 in order to determine which locations on the driver directed the gaze toward. This correlation is stored as a gridmap 50 which includes a plurality of lattice points, e.g., lattice points 51 (FIG. 7). Each lattice point includes positional information related to positional coordinates, e.g., X, Y and Z, as well as azimuth angle and elevation angle. Each lattice point also includes information related to how long the driver's gaze fell within the areas defined by the positional information. In some embodiments, the positional information for the gridmap 50 is determined based on known objects from the map 101 and/or detected objects in the gaze data 30. In some embodiments, only lattice points having a gaze duration above a threshold are included in the gridmap 50. In some embodiments, the threshold is adjusted based on state of the vehicle information from the localization unit 12. For example, in some embodiments, as a speed of a vehicle increases, the threshold gaze duration decreases to account for less time that a sign would be within a potential field of view of the driver. Once the grid map 50 is generated the gridmap 50 is stored in the memory unit 41. As additional gaze data 30 is received by the server 2, the gridmap 50 is able to be updated to include new lattice points or update information associated with already existing lattice points. In some embodiments, the attention area analyzer 40 is configured to generate the gridmap 50 for a single vehicle. In some embodiments, the attention area analyzer 40 is configured to generate the gridmap 50 for multiple vehicles. In some embodiments, the attention area analyzer 40 is configured to generate the gridmap 50 for a predetermined geographic area. In some embodiments, the attention area analyzer 40 is configured to generate and manage a plurality of gridmaps 50, such as a first gridmap for a first geographical region, a second gridmap for a second geographical region, and a third gridmap for a specific set of vehicles.

The memory unit 41 is configured to store the gridmap 50 and the histogram 53. In some embodiments, the memory unit 41 is further configured to store additional information such as the gaze data 30 and the map 101. In some embodiments, the memory unit 41 includes a solid-state memory device. In some embodiments, the memory unit 41 includes a dynamic random-access memory (DRAM). In some embodiments, the memory unit 41 includes a non-volatile memory device. In some embodiments, the memory unit 41 includes cloud-based storage or another suitable storage structure.

The gridmap 50 includes a plurality of lattice points. A non-limiting example of a gridmap 50 is in FIG. 7. In this example, the gridmap 50 includes a plurality of lattice point data 51. In some embodiments, the gridmap 50 is separately available for display at a request of a user, such as advertising sponsors 72 or advertisement agencies 74. In some embodiments, lattice points in the gridmap 50 are color-coded based on gaze duration. In some embodiments, the gridmap 50 is customizable to include only lattice points associated with a specified user, such as the advertising sponsors 72 or the advertisement agencies 74. In some embodiments, the gridmap 50 is customizable to include only lattice points of selected users. In some embodiments, the selected users include competitor companies for the advertising sponsors 60.

The histogram generator 52 is configured to analyze one or more gridmaps 50 storage in memory unit 41 and identify historical data to be compiled into the histogram 53. In some embodiments, the histogram generator 52 generates the histogram 53 based on time of day, weather conditions, sign location, sign angle relative to a vehicle heading, demographic information, or other suitable criteria. In some embodiments, the demographic information is based on driver identification information associated with log entries in the lattice points of the gridmap 50. In some embodiments, the demographic information is extracted based on characteristics of the driver from a captured image associated with log entries in the lattice points of the gridmap 50. For example, if the captured image of a driver indicates a person with facial hair, the driver is determined to be male, in some instances. Other physical characteristics are usable to determine other demographical information. In some embodiments, a trained neural network is usable to extract demographical information based on the captured image. In some embodiments, the histogram generator 52 is configured to generate the histogram 53 for a single vehicle. In some embodiments, the histogram generator 52 is configured to generate the histogram 53 for multiple vehicles. In some embodiments, the histogram generator 52 is configured to generate the histogram 53 for a predetermined geographic area. In some embodiments, the histogram generator 52 is configured to generate the histogram 53, such as a first histogram for a first geographical region, a second histogram for a second geographical region, and a third histogram for a specific set of vehicles. In some embodiments, the histogram generator 52 continues to update the histogram 53 as new gridmap 50 data is available. In some embodiments, the histogram generator 52 is configured to generate a new histogram 53 based on requested parameters received from the customers 3.

The advertisement adviser 60 is configured to receive the histogram 53 from the memory unit 41 and extract information to determine which signs or areas are viewed most and/or longest. Obtaining information related to areas where the occupants of the vehicle direct attention helps to identify locations for future advertisements. The advertisement adviser 60 is configured to provide the extracted information to customers 3. In some embodiments, the advertisement adviser 60 is configured to receive data requests from the customers 3 and extract information from the histogram 53 based on the received data requests. In some embodiments, the data requests includes information about types of product or services on specific signs; and the advertisement adviser 60 extracts information to identify demographics of people that showed interest in the corresponding product or service. In some embodiments, the product or service on the sign is extracted based on data captured by the front camera 5.

In some embodiments, the sign includes an electronic sign that changes advertisements periodically. In some embodiments, the advertisement adviser 60 associates time stamp information from the histogram 53 with an advertisement displayed on the electronic sign during the corresponding time stamp in order to determine which advertisement attracted the driver.

In some embodiments, the sign includes a sign that is mounted on a second vehicle that is moving. In some embodiments, the advertisement adviser 60 associates time stamp information and position information from the histogram 53 with an advertisement displayed on the second vehicle sign during the corresponding time stamp and the location where the second vehicle is known to be located in order to determine which advertisement attracted the driver.

The advertisement advisor 60 outputs the histogram information to be transmitted to the customers 3. In some embodiments, the server 2 transmits the histogram information to the customers 3 wirelessly. In some embodiments, the server 2 transmits the histogram information to the customers 3 via a wired connection. In some embodiments, the server 2 instructions a printer to print the histogram information, and the printed information is provided to the customers 3.

The customers 3 include advertising sponsor 72 who have products or services to advertise. The customers 3 further include advertisement agencies 74 who assist advertising sponsors 72 market products or services. In some embodiments, the advertisement agencies 74 include companies that lease the sign space. In some embodiments, the customers 3 include other people, companies or agencies. For example, in some embodiments, the customers 3 include government agencies that are able to use the information from the advertisement advisor 60 to grant permission for additional advertising locations or determine whether any advertising location presents a risk as being too distracting for drivers. In some embodiments, the customers 3 provide data requests to the server 2 for information related to specific signs, advertising sponsors 72 or other desired data. In some embodiments, the data requests are transmitted to the server 2 wirelessly. In some embodiments, the data requests are transmitted to the server 2 via a wired connection.

By outputting the histogram information to the customers 3, the vehicle occupant gaze detection system 100 is able to use real detected data to determine effectiveness of advertisements in attracting attention of occupants of vehicles. This effectiveness information is usable to assist advertising sponsors 72 in allocating resources in a more efficient manner. This effectiveness information is also usable by advertisement agencies 74 to set pricing options for different locations that are commensurate with the actual attention garnered by vehicle occupants. In addition, by updating the histogram 53 periodically or as new gaze data 30 is available, advertising sponsors 72 and advertisement agencies 74 are able to identify consumer trends without directly surveying consumers.

Figures 2, 3:
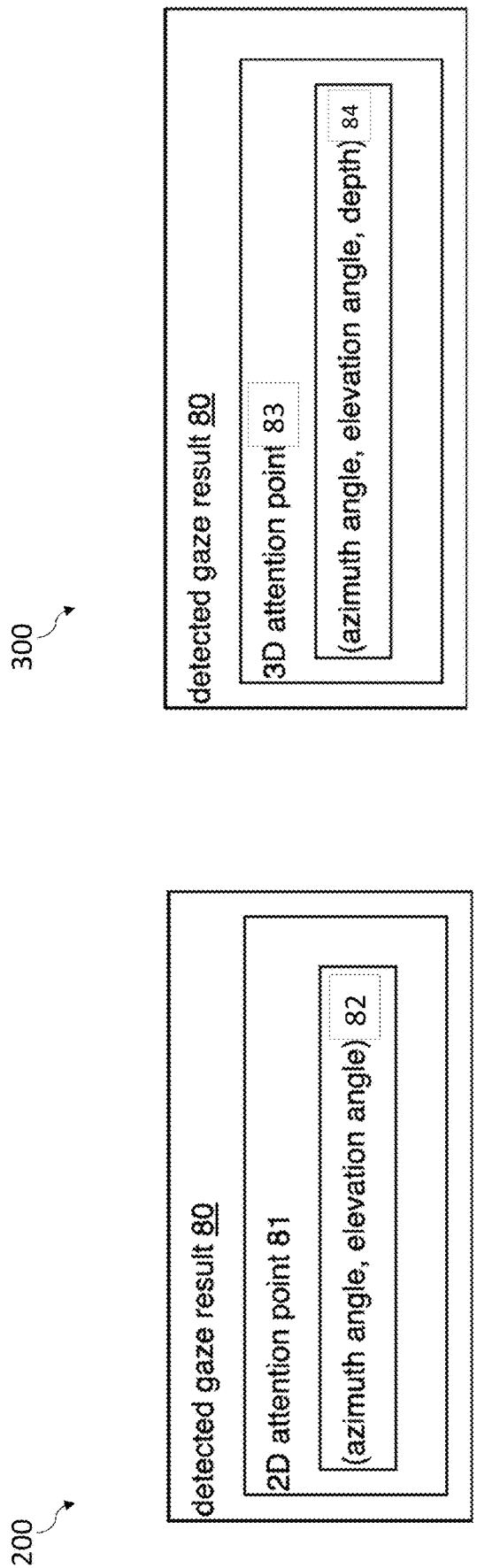
FIG. 2 is a diagram of a data structure of a detected gaze result in accordance with some embodiments.
FIG. 3 is a diagram of a data structure of a detected gaze result in accordance with some embodiments.

FIG. 2 is a diagram of a data structure 200 of a detected gaze result 80 in accordance with some embodiments. The detected gaze result 80 is generated using a gaze detector, e.g., gaze detector 10 (FIG. 1). The detected gaze result 80 includes a two-dimensional (2D) attention point 81. The attention point 81 is a location where a driver's gaze is directed. A 2D attention point 81 means that the attention point is within a two-dimensional plane. The 2D attention point 81 is based on data 82 including an azimuth angle and an elevation angle. Using the data 82, the gaze detector is able to determine the 2D attention point 81 for the detected gaze result 80. In some embodiments, the detected gaze result 80 is usable by a gaze data generator, e.g., gaze data generator 20 (FIG. 1), to generate gaze data, e.g., gaze data 30 (FIG. 1), for determining what, if any, signs a driver is viewing.

FIG. 3 is a diagram of a data structure 300 of a detected gaze result 80 in accordance with some embodiments. The detected gaze result 80 is generated using a gaze detector, e.g., gaze detector 10 (FIG. 1). In contrast with the data structure 200 (FIG. 2), the data structure 300 includes detected gaze result 80 having a three-dimensional (3D) attention point 83. A 3D attention point 83 means that the attention point is a point defined by three parameters. The 3D attention point 83 is based on data 84 including an azimuth angle, an elevation angle and depth. The 3D attention point 83 provides a higher degree of accuracy in comparison with the 2D attention point 81 (FIG. 2), but is produced using a larger processing load. Using the data 84, the gaze detector is able to determine the 3D attention point 83 for the detected gaze result 80. In some embodiments, the detected gaze result 80 is usable by a gaze data generator, e.g., gaze data generator 20 (FIG. 1), to generate gaze data, e.g., gaze data 30 (FIG. 1), for determining what, if any, signs a driver is viewing.

Figure 4:
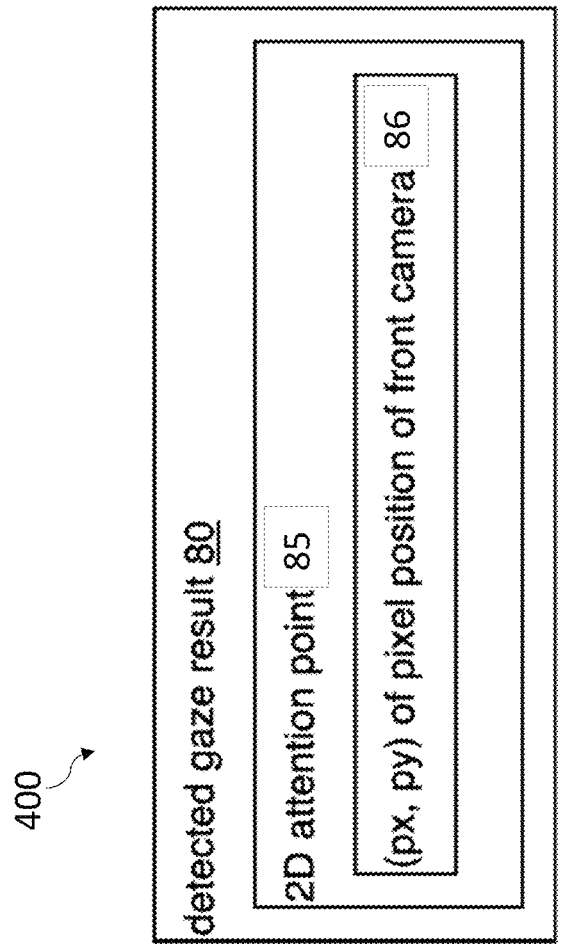
FIG. 4 is a diagram of a data structure of a detected gaze result in accordance with some embodiments.

FIG. 4 is a diagram of a data structure 400 of a detected gaze result 80 in accordance with some embodiments. The detected gaze result 80 is generated using a gaze detector, e.g., gaze detector 10 (FIG. 1). Similar to the data structure 200 (FIG. 2), the data structure 400 includes detected gaze result 80 having a two-dimensional (2D) attention point 85. In contrast with the data structure 200 (FIG. 2), the data structure 400 includes the 2D attention point 85 is based on data 86 including vertical and horizontal pixel locations in an image from a front camera, e.g., front camera 5 (FIG. 1). In some embodiments, the detected gaze result 80 is usable by a gaze data generator, e.g., gaze data generator 20 (FIG. 1), to generate gaze data, e.g., gaze data 30 (FIG. 1), for determining what, if any, signs a driver is viewing.

Figure 5:
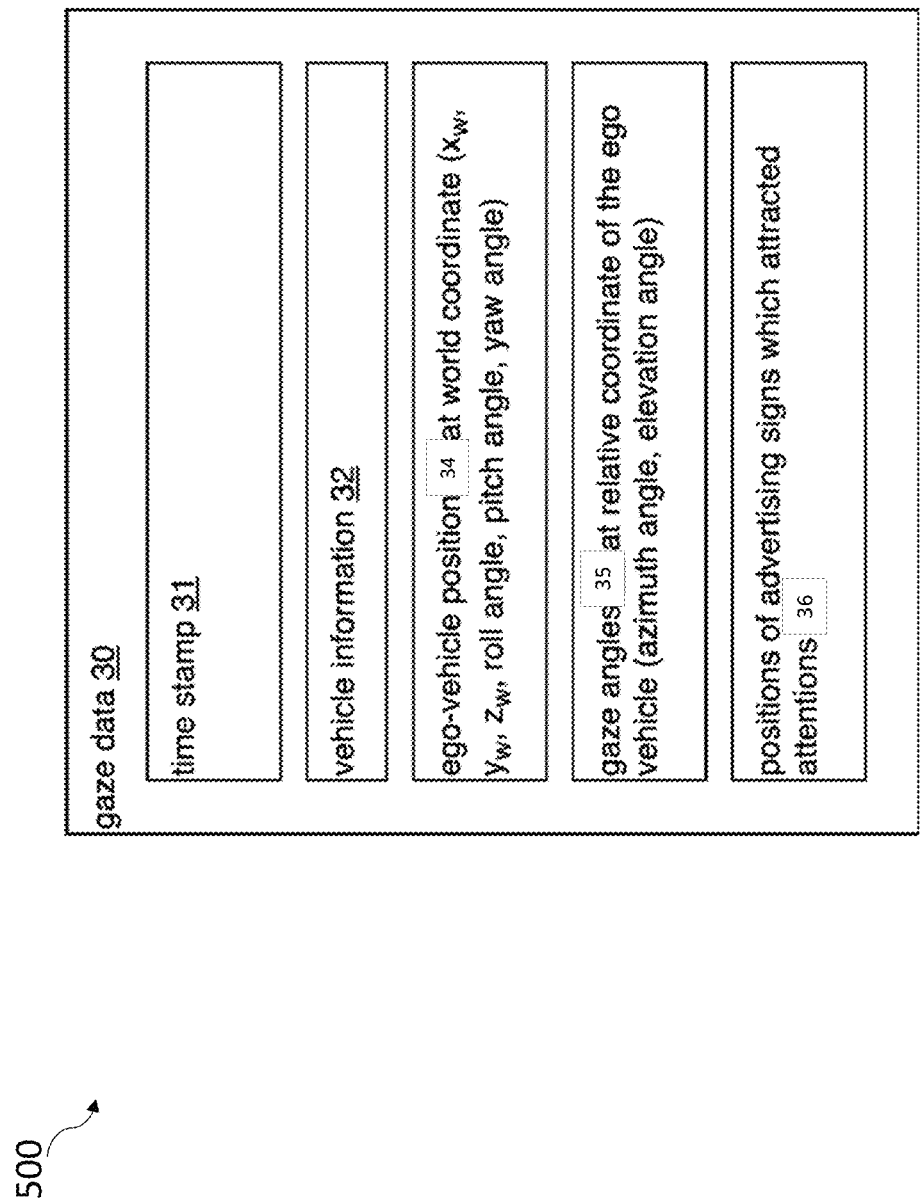
FIG. 5 is a diagram of a data structure of a gaze data in accordance with some embodiments.

FIG. 5 is a diagram of a data structure 500 of a gaze data 30 in accordance with some embodiments. The gaze data 30 is generated using a gaze data generator, e.g., gaze data generator 20 (FIG. 1). The gaze data 30 is usable to determine which, if any, signs a driver views as well as under what conditions the driver views the sign. The gaze data 30 includes a time stamp 31, which is a time that the data used to generate the gaze data 30 was collected, e.g., by driver monitoring camera 4 (FIG. 1). The gaze data 30 further includes vehicle information 32, which includes identifying information for the vehicle where the driver gaze data was collected. The gaze data 30 further includes a vehicle position 34, which is a location of the vehicle at the time the data used to generate the gaze data 30 was collected. In some embodiments, the vehicle position 34 is determined based on information from a GPS, e.g., GPS 6 (FIG. 1). The gaze data 30 further includes gaze angles 35 relative to the vehicle. In some embodiments, the gaze angles 35 includes an azimuth angle and an elevation angle. In some embodiments, the gaze data 30 further includes a depth coordinate associated with the gaze angles 35. In some embodiments, the gaze data 30 includes pixel positions associating the detected gaze direction of the driver with pixels from an image obtained from a camera, e.g., front camera 5 (FIG. 1), in place of the gaze angles 35. The gaze data 30 further includes positions of advertising signs 36. In some embodiments, the position of the advertising signs 36 is limited to only advertising signs determined as having attracted an attention of the driver. In some embodiments, the position of the advertising signs 36 includes all known advertising signs. In some embodiments, the position of the advertising signs 36 is determined based on a map, e.g., map 7 (FIG. 1), and/or captured images, e.g., from front camera 5 (FIG. 1). In some embodiments, the position of the advertising signs 36 is omitted from the gaze data 30. In some embodiments where the position of advertising signs 36 is omitted from the gaze data 30, the gaze data 30 is able to be compared with other data, e.g., map 101 (FIG. 1), to determine positions of advertising signs which attracted the attention of the driver. In some embodiments, the position of the advertising signs 36 is empty when there are no advertisement signs in the area yet.

Figure 6:
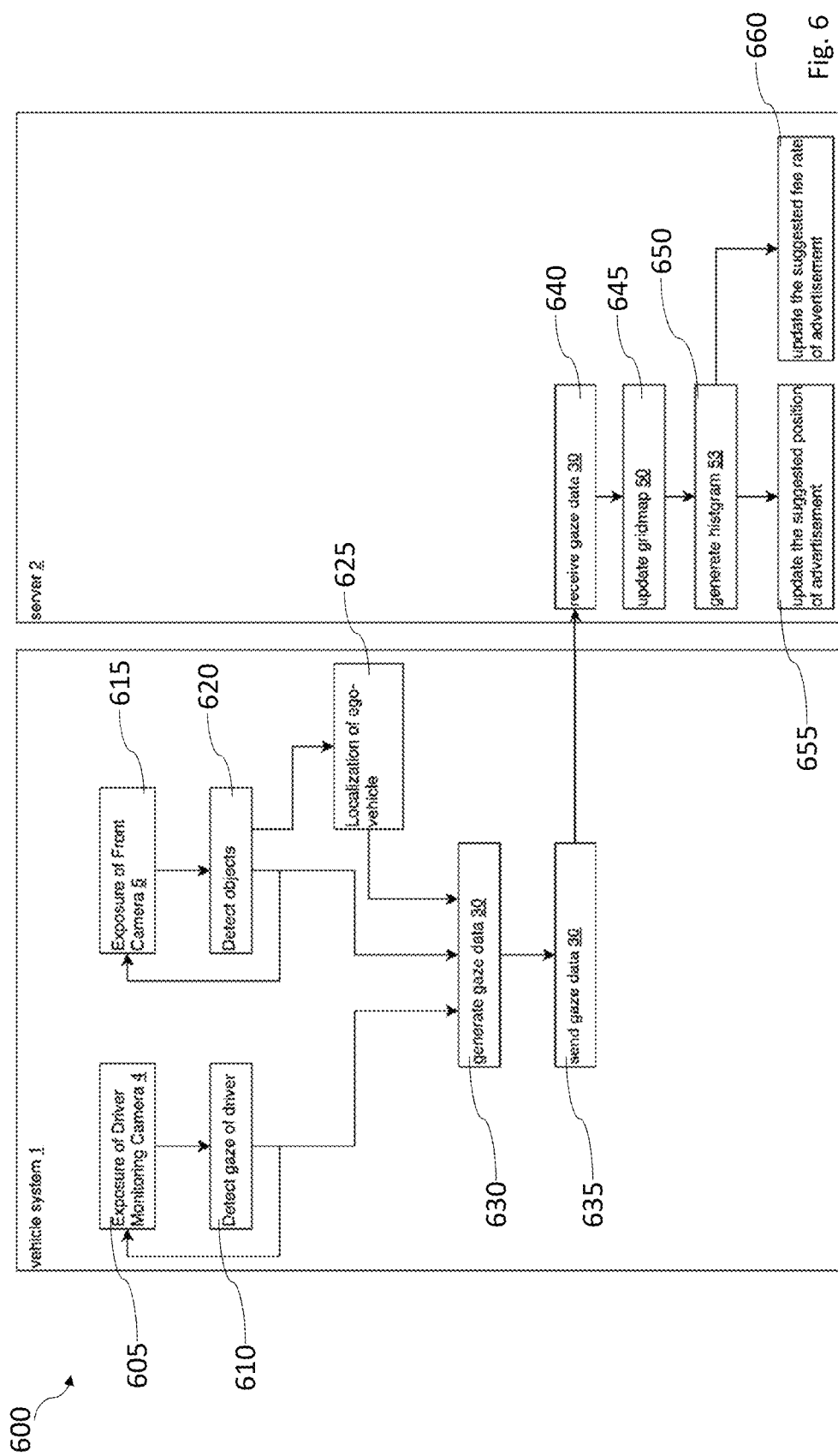
FIG. 6 is a flowchart of a method of using a vehicle occupant gaze detection system in accordance with some embodiments.

FIG. 6 is a flowchart of a method 600 of using a vehicle occupant gaze detection system in accordance with some embodiments. In some embodiments, the method 600 is implemented using the vehicle occupant gaze detection system 100 (FIG. 1). In some embodiments, the method 600 is implemented using a vehicle occupant gaze detection system different from the vehicle occupant gaze detection system 100 (FIG. 1). One of ordinary skill in the art would understand that while the method 600 is described with respect to a driver, the method 600 is applicable to any occupant of a vehicle. While FIG. 6 includes some reference numbers similar to FIG. 1, one of ordinary skill in the art would recognize that these reference numbers are provide merely for clarity and ease of understanding and are not intended to limit the scope of the method 600 to only the system described in FIG. 1.

The method 600 includes operation 605 in which images of a driver are captured using a driver monitoring camera, e.g., driver monitoring camera 4 (FIG. 1). In some embodiments, the images of the driver are captured using a single image capturing device. In some embodiments, the images of the driver are captured using multiple image capturing devices. In some embodiments, the image capturing devices are located at different positions relative to the driver. In some embodiments, at least one of the image capturing devices is able to be selectively deactivated.

The method 600 further includes operation 610 in which a gaze of the driver is detected based on the captured images of the driver. In some embodiments, the gaze of the driver is detected based on an azimuth angle and an elevation angle of eyes of the driver detected based on the captured images of the driver. In some embodiments, the gaze of the driver is also detected based on a depth coordinate determined based on visual axes of the eyes of the driver from the captured images of the driver. In some embodiments, the gaze of the driver is detected based on information from a camera, e.g., front camera 5 (FIG. 1), of the vehicle; and the gaze is associated with pixel locations of images captured by the camera. In some embodiments, the operation 610 is performed based on data collected in operation 615. In some embodiments, the gaze of the driver is detected using a gaze detector, e.g., gaze detector 10 (FIG. 1). In some embodiments, a result of the gaze detection has the data structure 200 (FIG. 2). In some embodiments, a result of the gaze detection has the data structure 300 (FIG. 3). In some embodiments, a result of the gaze detection has the data structure 400 (FIG. 4).

Following operation 610, the method 600 branches. Along a first branch, the method 600 returns to operation 605 and additional images of the driver are captured. Along a second branch, the method 600 proceeds to operation 630.

The method 600 further includes operation 615 in which images of an environment surrounding the vehicle are captured. The images of the environment surrounding the vehicle are captured using one or more sensors mounted to the vehicle. In some embodiments, the sensors include a visual light camera, an IR camera, a LiDAR sensor, a RADAR sensor, a SONAR sensor, or another suitable sensor. In some embodiments, the sensor includes front camera 5 (FIG. 1). In some embodiments, the captured images from operation 615 are used in operation 610 to relate a gaze of a driver to the captured images from operation 615.

The method 600 further includes operation 620 in which objects are detected based on the data collected in operation 615. In some embodiments, the objects are detected by a trained neural network analyzing the data from operation 615. In some embodiments, the objects are detected using an object detector, e.g., object detector 11 (FIG. 1). In some embodiments, the neural network of the object detector 11 uses a neural network architecture such as Single Shot Detector (SSD), Faster R-CNN, and etc. In some embodiments, in addition to detecting a position of the objects, operation 620 includes detecting an angle of the objects relative to the vehicle.

Following operation 620, the method 600 branches. Along a first branch, the method 600 returns to operation 615 and additional images of the environment surrounding the vehicle are captured. Along a second branch, the method 600 proceeds to operation 630. Along a third branch, the method 600 proceeds to operation 625.

The method 600 further includes operation 625 in which a location of the vehicle in the world coordinate system or a location of the vehicle relative to the objects detected in operation 620 is determined. In some embodiments, the operation 625 further determines state information for the vehicle. In some embodiments, the state information includes speed of the vehicle. In some embodiments, the state information includes velocity vector of the vehicle. In some embodiments, the state information includes heading of the vehicle. In some embodiments, the state information includes acceleration vector of the vehicle. In some embodiments, the state information includes jerk vector of the vehicle. In some embodiments, the state information includes whether an engine or motor of the vehicle is running. In some embodiments, the state information includes other status information related to the vehicle, such as changes in speed (acceleration), operation of wind shield wipers, etc. In some embodiments, the operation 625 is implemented using a localization unit, e.g., localization unit 12 (FIG. 1).

The method 600 further includes operation 630 in which gaze data is generated based on data from operation 610, operation 620 and operation 625. The gaze data is generated using a gaze data generator, e.g., gaze data generator 20 (FIG. 1). In some embodiments, the operation 630 produces gaze data 30 (FIG. 1). In some embodiments, the gaze data includes time stamp information, vehicle information of the vehicle system, position of the vehicle, and gaze angles of the driver relative to the vehicle. In some embodiments, the gaze data further links the gaze data with locations of objects from either the operation 620 and/or the operation 625. In some embodiments, operation 630 determines what, if any, signs are visible to the driver. In some embodiments, the operation 630 identifies objects that are obstructed by other objects that would prevent the driver from seeing the obstructed objects. In some embodiments, the gaze data excludes any gaze data related to objects that are determined as being obstructed based on information from the operation 620 and/or the operation 625. In some embodiments, the gaze data includes the information of the second vehicle (such as a position, a license plate ID, and etc.) where an advertising sign are displayed.

In some embodiments, the gaze data further includes at least one image of the driver to permit demographic analysis of the driver based on the captured image. In some embodiments, the gaze data includes driver identification data, such as an identification number of the driver, to permit demographic analysis of the driver. In some embodiments, the driver identification data is received based on ownership or rental information from an internal memory or from an external device.

The method 600 further includes operation 635 in which the gaze data generated in operation 630 is sent to a server, e.g., server 2 (FIG. 1). In some embodiments, the gaze data is transmitted wirelessly. In some embodiments, the gaze data is transmitted via a wired connection. The method 600 further includes operation 640 in which the gaze data is received by the server, e.g., server 2 (FIG. 1).

The method 600 further includes operation 645 in which a gridmap is updated. If no gridmap exists, then the gridmap is generated in operation 645. The gridmap includes lattice points which associates locations with the received gaze data. In some embodiments, the gridmap includes gridmap 50 (FIG. 1). In some embodiments, the gridmap is updated using an attention area analyzer, e.g., attention area analyzer 40 (FIG. 1). In some embodiments, positional information for the gridmap is determined based on known objects from a map, e.g., map 101 (FIG. 1), and/or detected objects identified in the gaze data. In some embodiments, only lattice points having a gaze duration above a threshold are updated in the gridmap. In some embodiments, the threshold is adjusted based on state of the vehicle information from the localization unit 12. Once the grid is generated the gridmap is stored in a memory unit, e.g., memory unit 41 (FIG. 1). In some embodiments, multiple gridmaps are generated or updated based on the received gaze data.

The method 600 further includes operation 650 in which a histogram is generated based on the gridmap updated in operation 645. If a histogram already exists, then the histogram is updated in operation 650. In some embodiments, the histogram is histogram 53 (FIG. 1). In some embodiments, the histogram is generated using a histogram generator, e.g., histogram generator 52 (FIG. 1). The histogram relates the gaze data from the gridmap with additional parameters, such as time of day, weather conditions, sign location, sign angle relative to a vehicle heading, demographic information, or other suitable criteria.

The method 600 further includes operation 655 in which includes updating suggested positions for advertisements. If no previous suggestion was issued, then operation 655 includes issuing suggested positions for advertisements. In some embodiments, the suggested positions are determined based on which locations of have a highest amount of views based on the received gaze data. In some embodiments, the suggested positions are determined based on demographics of target customers and demographic information of driver gaze data that matches target customers. In some embodiments, operation 655 suggests a type (car model, color, size, etc.) of the second vehicle that the advertisement is displayed upon and also suggests the travel routes of the second vehicle in order to help maximize exposure of the displayed advertisement to potential customers. In some embodiments, the updated suggested positions are sent to advertising sponsors, e.g., advertising sponsors 72, and/or advertisement agencies, e.g., advertisement agencies 74. In some embodiments, the updated suggested positions are transmitted wirelessly. In some embodiments, the updated suggested positions are transmitted via a wired connection.

The method 600 further includes operation 660 in which the suggested fee rate for advertisement at a specific location is updated. If no previous suggestion was issued, then operation 660 includes issuing suggested fee rates for advertisements. In some embodiments, the suggested fee rates are determined based on which locations of have a highest amount of views based on the received gaze data. In some embodiments, the suggested fee rates are determined based on demographics of target customers and demographic information of driver gaze data that matches target customers. In some embodiments, the updated suggested fee rates are sent to advertising sponsors, e.g., advertising sponsors 72, and/or advertisement agencies, e.g., advertisement agencies 74. In some embodiments, the updated suggested fee rates are transmitted wirelessly. In some embodiments, the updated suggested fee rates are transmitted via a wired connection.

In some embodiments, additional operations are included in the method 600. For example, in some embodiments, the method 600 includes generating demographical information for the driver based on the captured images of the driver. In some embodiments, an order of operations of the method 600 is changed. For example, in some embodiments, a gridmap is generated prior to transmission to the server. In some embodiments, at least one operation of the method 600 is omitted. For example, in some embodiments, operation 655 is omitted and only suggestions related to fee rates are provided.

Figure 8:
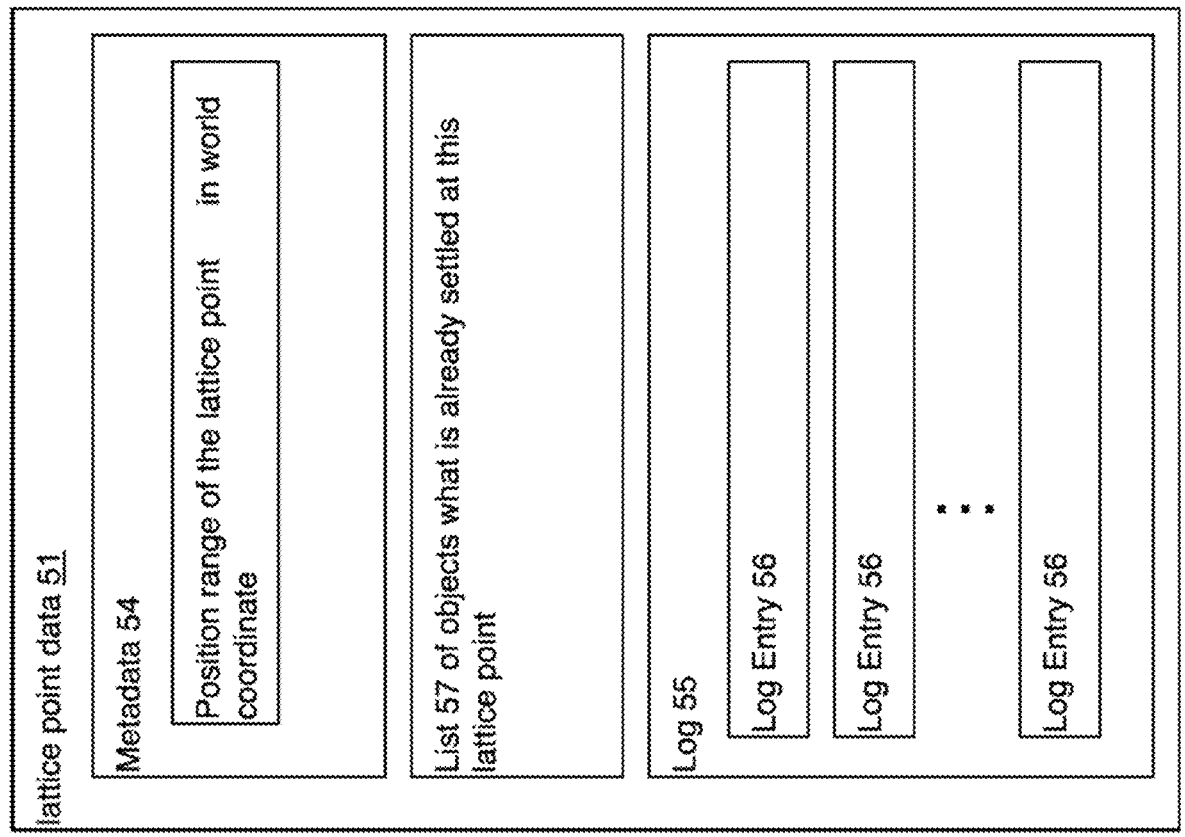
FIG. 8 is a diagram of a data structure of lattice point data in accordance with some embodiments.

FIG. 7 is a diagram of a data structure 700 of a gridmap 50 in accordance with some embodiments. The gridmap 50 is generated or updated based on gaze data, e.g., gaze data 30 (FIG. 1), received about a driver and map data, e.g., map 101 (FIG. 1), and/or detected objects indicating a location of signs. In some embodiments, the gridmap 50 is generated by attention area analyzer 40 (FIG. 1). In some embodiments, the gridmap 50 is generated during operation 645 (FIG. 6). In some embodiments, the gridmap 50 is generated by gaze data generator 20 at vehicle system 1 and is transmitted from the vehicle system 1 to the server 2 via network. The gridmap 50 includes an array of lattice points 51. In some embodiments, the data structure 700 includes a two-dimensional array of lattice points 51 where the dimensions are corresponding to x-axis and y-axis which are parallel to the ground. In some embodiments, the data structure 700 includes a three-dimensional array of lattice point 51 where the dimensions are corresponding to x-axis, y-axis and z-axis where z-axis is perpendicular to the ground. In some embodiments, the data structure 700 includes a 4-dimensional array of lattice points 51 where the dimensions are corresponding to x-axis, y-axis, azimuth angle and elevation angle. In some embodiments, the data structure 700 includes a 5-dimensional array of lattice points 51 where the dimensions are corresponding to x-axis, y-axis, z-axis, azimuth angle and elevation angle. In some embodiments, the data structure 700 includes a 4-dimensional array of lattice points 51 where the dimensions are corresponding to a latitude, a longitude, azimuth angle and elevation angle where the latitude and the longitude is the latitude and the longitude of World Geodetic System (WGS84). Each lattice point 81 includes information related to a geographic position as well as azimuth angle and elevation angle relative to a vehicle. FIG. 8 include a non-limiting example of a data structure of a lattice point 51 according to some embodiments.

FIG. 8 is a diagram of a data structure 800 of lattice point data 51 in accordance with some embodiments. In some embodiments, the lattice point data 51 is usable in the gridmap 50 (FIGS. 1 and 7). The lattice point data 51 includes metadata 54. The metadata 54 includes information a position range of the lattice point, such as geographic coordinates, azimuth angle and elevation angle. The metadata 54 includes "absolute" positional and angle values. An "absolute" value means that the value is corrected for a position and heading of the vehicle in order to determine a value relative to a fixed point. In some embodiments, the metadata 54 includes positional and angle values relative to a latitude or longitude of the Earth. The metadata 54 is usable to determine a location in the real-world which corresponds to the lattice point data 51. The lattice point data 51 further includes a list 57 of objects known or detected to be present that the location of the lattice point data 51. In some embodiments, the list 57 includes objects based on information received from a map, e.g., map 101 (FIG. 1). In some embodiments, the list 57 includes objects based on object detection performed on images captured by a vehicle. In some embodiments, the information related to object detection is received as part of gaze data, e.g., gaze data 30 (FIG. 1), and is generated by an object detector, e.g., object detector 10 (FIG. 1), in a vehicle. The lattice point data 51 further includes a log 56. The log 56 includes information related to when the location indicated by the metadata 54 was viewed based on received gaze data, e.g., gaze data 30 (FIG. 1). The log 56 includes one or more log entries 56. Each log entry 56 is related to another detected viewing of the location associated with the lattice point data 51. In some embodiments, all log entries 56 are maintained within the lattice point data 51. In some embodiments, log entries 56 having a time stamp beyond a threshold value are erased or overwritten. In some embodiments, the data structure 700 includes a 4-dimensional array of lattice points 51 where the dimensions are corresponding to a latitude, a longitude, azimuth angle and elevation angle, and when the point that is corresponding to the latitude and longitude is gazed towards the gaze direction that is corresponding to the azimuth angle and elevation angle, the log entry is added to the grid point that is corresponding to the latitude, longitude, the azimuth angle and the elevation angle in the 4D array. In some embodiments, a log entry 56 is generated only if the location associated with the lattice point data 51 satisfies a threshold duration. In some embodiments, the threshold duration is determined based on factors such as a speed of a vehicle at the time the data used to generate the gaze data was collected. In some embodiments, the log entry 56 has a data structure 900 (FIG. 9).

FIG. 9 is a diagram of a data structure 900 of a log entry 56 in accordance with some embodiments. In some embodiments, the data structure 900 is usable as log entries 56 for data structure 800 (FIG. 8). The log entry 56 includes a time 57 at which a location associated with a lattice point, e.g., lattice point 51 (FIG. 7), is viewed. In some embodiments, the time 57 is received as part of gaze data, e.g., gaze data 30 (FIG. 1). The log entry 56 further includes a position 58 of a vehicle in which the driver viewed the location associated with the lattice point. In some embodiments, the position 58 is received as part of the gaze data and is determined using a GPS, e.g., GPS 6 (FIG. 1). The log entry 56 further includes identification information 59 for the vehicle in which the driver viewed the location associated with the lattice point. In some embodiments, the identification information 59 is received as part of the gaze data and is retrieved from a memory in the vehicle. In some embodiments, the identification information 59 is usable to generate demographic information of the driver. In some embodiments, the log entry 56 further includes demographic information of the driver. In some embodiments, the demographic information is generated based on the identification information 59, analysis of an image of the driver, or other suitable processes. In some embodiments, the demographic information includes gender, age, height, weight, or other suitable information.

Figure 10:
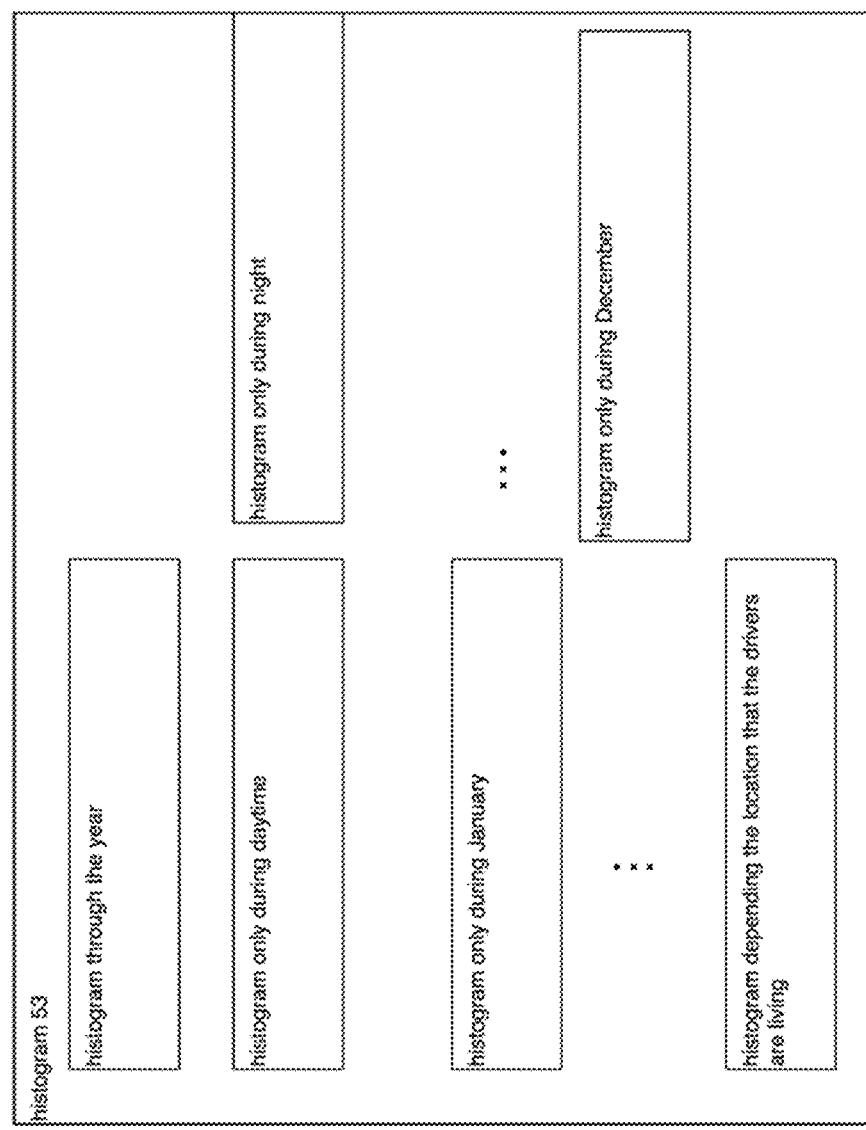
FIG. 10 is a diagram of a data structure of a histogram in accordance with some embodiments.

FIG. 10 is a diagram of a data structure 1000 of a histogram 53 in accordance with some embodiments. The histogram 53 is generated based on analysis of a gridmap, e.g., gridmap 50 (FIGS. 1 and 7). The histogram 53 is generated by a histogram generator, e.g., histogram generator 52 (FIG. 1). The histogram 53 includes information related to a count of a number of views for each lattice point of the gridmap. In some embodiments, the histogram 53 includes three-dimensional data, e.g., view count, x-axis coordinate, and y-axis coordinate. In some embodiments, the histogram 53 includes four-dimensional data, e.g., view count, x-axis coordinate, y-axis coordinate, and z-axis coordinate. In some embodiments, the histogram 53 includes five-dimensional data, e.g., view count, x-axis coordinate, y-axis coordinate, azimuth angle, and elevation angle. In some embodiments, the data in the histogram is further parsed based on external parameters in order to determine whether view counts are impacted by external events, such as time of day, weather conditions, time of year, vehicle speed, location relative to home address of vehicle, demographic information of the driver, or another suitable parameter. In some embodiments, the parameters are predetermined, i.e., the system parses the data based on well-known commonly used parameters. In some embodiments, the parameters are set based on received data requests from advertisers or advertising sponsors.

In some embodiments, the histogram generator, e.g., histogram generator 52 (FIG. 1), generates the histogram 53 to include bins for counts of views based on these parameters. In some embodiments, the histogram generator is able to place the view counts into the parameter bins based on time stamp information in the metadata. In some embodiments, the time stamp information is correlated with external sources, e.g. a weather database or an almanac database, to determine environmental conditions associated with the timestamp information, such as sunny or during the daytime. In some embodiments, the histogram generator uses vehicle registration information in the metadata to determine a home address of the driver in order to determine a distance between the viewed advertisement and the home of the driver. One of ordinary skill in the art would understand that additional parameters for parsing the view counts is possible based on information available in the metadata.

Figure 11:
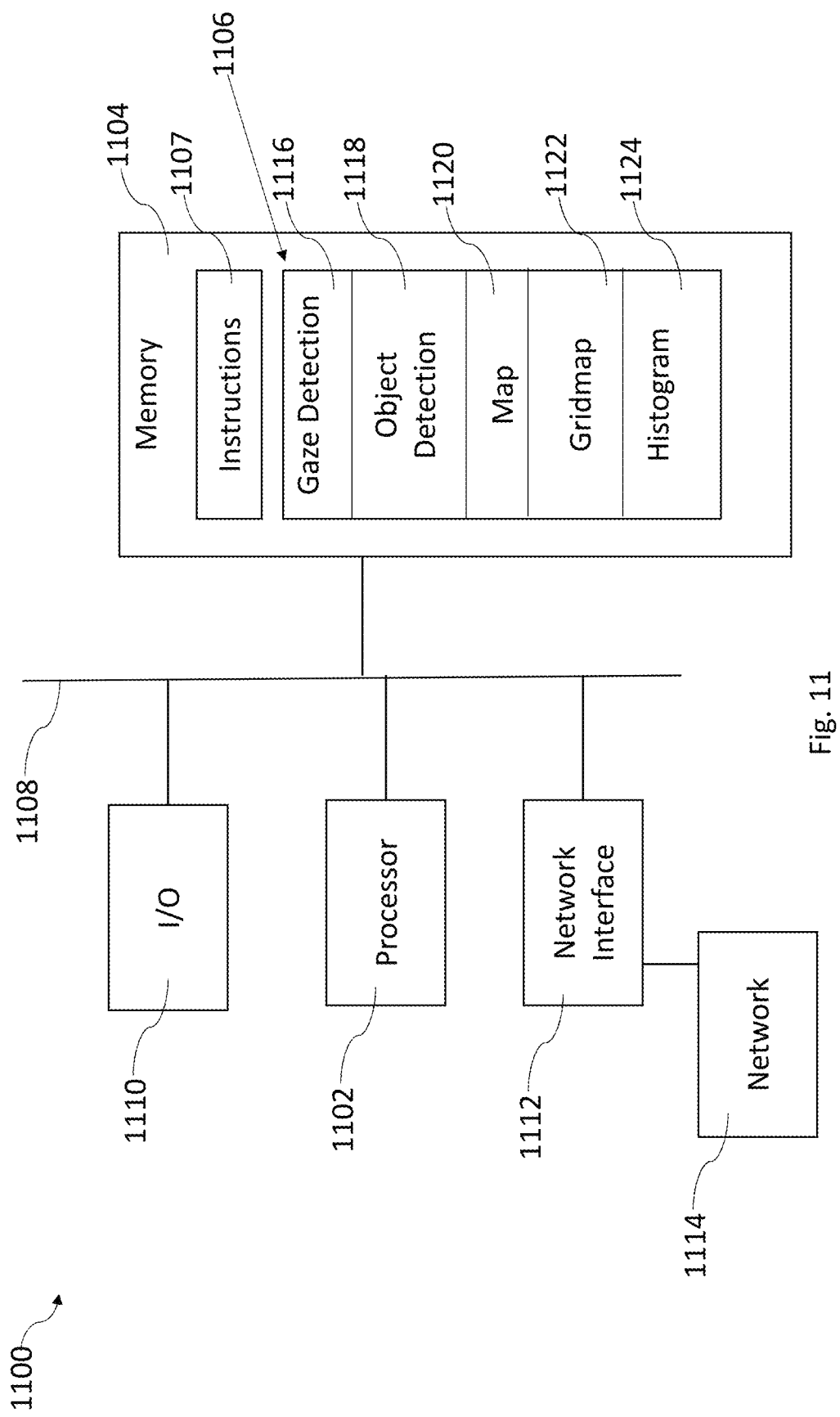
FIG. 11 is a diagram of a system for implementing a vehicle occupant gaze detection system in accordance with some embodiments.

FIG. 11 is a diagram of a system 1100 for implementing a vehicle occupant gaze detection system in accordance with one or more embodiments. System 1100 includes a hardware processor 1102 and a non-transitory, computer readable storage medium 1104 encoded with, i.e., storing, the computer program code 1106, i.e., a set of executable instructions. Computer readable storage medium 1104 is also encoded with instructions 1107 for interfacing with external devices. The processor 1102 is electrically coupled to the computer readable storage medium 1104 via a bus 1108. The processor 1102 is also electrically coupled to an I/O interface 1110 by bus 1108. A network interface 1112 is also electrically connected to the processor 1102 via bus 1108. Network interface 1112 is connected to a network 1114, so that processor 1102 and computer readable storage medium 1104 are capable of connecting to external elements via network 1114. The processor 1102 is configured to execute the computer program code 1106 encoded in the computer readable storage medium 1104 in order to cause system 1100 to be usable for performing a portion or all of the operations as described in vehicle occupant gaze detection system 100 (FIG. 1) or method 600 (FIG. 6).

In some embodiments, the processor 1102 is a central processing unit (CPU), a multi-processor, a distributed processing system, an application specific integrated circuit (ASIC), and/or a suitable processing unit.

In some embodiments, the computer readable storage medium 1104 is an electronic, magnetic, optical, electromagnetic, infrared, and/or a semiconductor system (or apparatus or device). For example, the computer readable storage medium 1104 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1104 includes a compact disk-read only memory (CD-ROM), a compact disk-read/write (CD-R/W), and/or a digital video disc (DVD).

In some embodiments, the storage medium 1104 stores the computer program code 1106 configured to cause system 1100 to perform all or part of the operations of vehicle occupant gaze detection system 100 (FIG. 1) or method 600 (FIG. 6). In some embodiments, the storage medium 1104 also stores information needed for performing all or part of vehicle occupant gaze detection system 100 (FIG. 1) or method 600 (FIG. 6) as well as information generated during performing all or part of vehicle occupant gaze detection system 100 (FIG. 1) or method 600 (FIG. 6), such as a gaze detection parameter 1116, an object detection parameter 1118, a map parameter 1120, a gridmap parameter 1122, a histogram parameter 1124 and/or a set of executable instructions to perform the operation of all or part of vehicle occupant gaze detection system 100 (FIG. 1) or method 600 (FIG. 6).

In some embodiments, the storage medium 1104 stores instructions 1107 for interfacing with manufacturing machines. The instructions 1107 enable processor 1102 to generate instructions readable by the external devices to effectively implement all or part of vehicle occupant gaze detection system 100 (FIG. 1) or method 600 (FIG. 6).

System 1100 includes I/O interface 1110. I/O interface 1110 is coupled to external circuitry. In some embodiments, I/O interface 1110 includes a keyboard, keypad, mouse, trackball, trackpad, and/or cursor direction keys for communicating information and commands to processor 1102.

System 1100 also includes network interface 1112 coupled to the processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interface such as ETHERNET, USB, or IEEE-1394. In some embodiments, all or part of vehicle occupant gaze detection system 100 (FIG. 1) or method 600 (FIG. 6) is implemented in two or more systems 1100, and information such as gaze data, map data, object detection data, or captured images are exchanged between different systems 1100 via network 1114.

An aspect of this description relates to a vehicle occupant gaze detection system. The vehicle occupant gaze detection system includes a non-transitory computer readable medium configured to store instructions thereon. The vehicle occupant gaze detection system further includes a processor connected to the non-transitory computer readable medium. The processor is configured to execute the instructions for receiving gaze data from a vehicle, wherein the gaze data includes information related to a viewing direction of an occupant of a vehicle, vehicle information, and time stamp information. The processor is further configured to execute the instructions for generating a gridmap based on the received gaze data and map data, wherein the gridmap includes an array of lattice points, and each lattice point of the array of lattice points corresponds to a location of a plurality of locations. The processor is further configured to execute the instructions for generating a histogram based on the gridmap, wherein the histogram includes information related to viewing of at least one of the plurality of locations by the occupant of the vehicle based on the time stamp information. The processor is further configured to execute the instructions for determining an effectiveness of an object positioned the at least one location based on the histogram. The processor is further configured to execute the instructions for transmitting a recommendation based on the effectiveness of the object to a customer. In some embodiments, the processor is further configured to execute the instructions for generating demographic information for the occupant of the vehicle based on a captured image of the occupant. In some embodiments, the processor is further configured to execute the instructions for generating the histogram based on the demographic information. In some embodiments, the processor is further configured to execute the instructions for generating a pricing recommendation based on the histogram; and transmitting the pricing recommendation to the customer. In some embodiments, the processor is further configured to execute the instructions for receiving a data request from the customer; and generating the histogram based on the received data request. In some embodiments, the processor is further configured to execute the instructions for updating the gridmap in response to receive a second gaze data; and updating the histogram in response to updating the gridmap. In some embodiments, the occupant of the vehicle is a driver of the vehicle.

An aspect of this description relates to a method. The method includes receiving gaze data from a vehicle, wherein the gaze data includes information related to a viewing direction of an occupant of a vehicle, vehicle information, and time stamp information. The method further includes generating a gridmap based on map data and the received gaze data, wherein the gridmap includes an array of lattice points, and each lattice point of the array of lattice points corresponds to a location of a plurality of locations. The method further includes generating a histogram based on the gridmap, wherein the histogram includes information related to viewing of at least one of the plurality of locations by the occupant of the vehicle based on the time stamp information. The method further includes determining an effectiveness of an object positioned at the at least one location based on the histogram. The method further includes transmitting a recommendation based on the effectiveness of the object to a customer. In some embodiments, the method further includes generating demographic information for the occupant of the vehicle based on a captured image of the occupant. In some embodiments, generating the histogram includes generating the histogram based on the demographic information. In some embodiments, the method further includes generating a pricing recommendation based on the histogram; and transmitting the pricing recommendation to the customer. In some embodiments, the method further includes receiving a data request from the customer; and generating the histogram based on the received data request. In some embodiments, the method further includes updating the gridmap in response to receive a second gaze data; and updating the histogram in response to updating the gridmap. In some embodiments, the occupant of the vehicle is a driver of the vehicle.

An aspect of this description relates to a vehicle occupant gaze detection system. The vehicle occupant gaze detection system includes a sensor configured to capture data regarding an environment surrounding a vehicle. The vehicle occupant gaze detection system further includes a camera configured to capture an image of an occupant of the vehicle. The vehicle occupant gaze detection system further includes a non-transitory computer readable medium configured to store instructions thereon. The vehicle occupant gaze detection system further includes a processor connected to the non-transitory computer readable medium. The processor is configured to execute the instructions for generating a gaze detection result based on the captured image of the occupant, wherein the gaze detection result indicates a direction which the occupant is looking. The processor is further configured to execute the instructions for detecting an object based on the captured data from the sensor. The processor is further configured to execute the instructions for generating vehicle state information for the vehicle based on the detected object, a position of the vehicle and map data. The processor is further configured to execute the instructions for generating gaze data based on the gaze detection result, the detected object and the vehicle state information, wherein the gaze data includes time stamp information associated with the gaze detection result. The processor is further configured to execute the instructions for transmitting the gaze data to an external device. In some embodiments, the processor is further configured to execute the instructions for generating the gaze detection result based on a detected azimuth angle and a detected elevation angle based on analysis of the captured image of the occupant. In some embodiments, the processor is further configured to execute the instructions for generating the gaze detection result including depth information based on visual axes of eyes of the occupant in the captured image. In some embodiments, the processor is further configured to execute the instructions for generating the gaze data based on a correlation between the gaze detection result and pixel locations of a surrounding image captured by the sensor. In some embodiments, the vehicle occupant gaze detection system further includes a global positioning system (GPS); and a map stored in the non-transitory computer readable medium, wherein the processor is further configured to execute the instructions for generating the vehicle state information based on information from the GPS and the map data from the map stored in the non-transitory computer readable medium. In some embodiments, the occupant is a driver of the vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle occupant gaze detection system comprising:
a non-transitory computer readable medium configured to store instructions thereon; and
a processor connected to the non-transitory computer readable medium, wherein the processor is configured to execute the instructions for:
receiving gaze data from a vehicle, wherein the gaze data includes information related to a viewing direction of an occupant of the vehicle, information related to a viewing depth of the occupant, vehicle information, and time stamp information;
generating a gridmap based on map data and the received gaze data, wherein the gridmap comprises an array of lattice points, and each lattice point of the array of lattice points corresponds to a location of a plurality of locations;
generating a histogram based on the gridmap, wherein the histogram includes information related to viewing of at least one of the plurality of locations by the occupant of the vehicle based on the time stamp information;
determining an effectiveness of an object positioned at the at least one location based on the histogram; and
transmitting a recommendation based on the effectiveness of the object to a customer.

2. The vehicle occupant gaze detection system according to claim 1, wherein the processor is further configured to execute the instructions for generating demographic information for the occupant of the vehicle based on a captured image of the occupant.

3. The vehicle occupant gaze detection system according to claim 2, wherein the processor is further configured to execute the instructions for generating the histogram based on the demographic information.

4. The vehicle occupant gaze detection system according to claim 1, wherein the processor is further configured to execute the instructions for generating a pricing recommendation based on the histogram; and transmitting the pricing recommendation to the customer.

5. The vehicle occupant gaze detection system according to claim 1, wherein the processor is further configured to execute the instructions for receiving a data request from the customer; and generating the histogram based on the received data request.

6. The vehicle occupant gaze detection system according to claim 1, wherein the processor is further configured to execute the instructions for updating the gridmap in response to receive a second gaze data; and updating the histogram in response to updating the gridmap.

7. The vehicle occupant gaze detection system according to claim 1, wherein the occupant of the vehicle is a driver of the vehicle.

8. A method comprising:
receiving gaze data from a vehicle, wherein the gaze data includes information related to a viewing direction of an occupant of the vehicle, vehicle information, and time stamp information, and the time stamp information indicates a point in time at which the gaze data is received;
generating a gridmap based on the received gaze data and map data, wherein the gridmap comprises an array of lattice points, and each lattice point of the array of lattice points corresponds to a location of a plurality of locations;
generating a histogram based on the gridmap, wherein the histogram includes information related to viewing of at least one of the plurality of locations by the occupant of the vehicle based on the time stamp information;
determining an effectiveness of an object positioned at the at least one location based on the histogram and the time stamp information; and
transmitting a recommendation based on the effectiveness of the object to a customer.

9. The method according to claim 8, further comprising generating demographic information for the occupant of the vehicle based on a captured image of the occupant.

10. The method according to claim 9, wherein generating the histogram comprises generating the histogram based on the demographic information.

11. The method according to claim 8, further comprising:
generating a pricing recommendation based on the histogram; and
transmitting the pricing recommendation to the customer.

12. The method according to claim 8, further comprising:
receiving a data request from the customer; and
generating the histogram based on the received data request.

13. The method according to claim 8, further comprising:
updating the gridmap in response to receive a second gaze data; and
updating the histogram in response to updating the gridmap.

14. The method according to claim 8, wherein the occupant of the vehicle is a driver of the vehicle.

* * * * *